United States Patent [19]

Bennett et al.

[11] Patent Number: 4,805,450
[45] Date of Patent: Feb. 21, 1989

[54] METHOD OF LOCATING HYDROCARBON PRODUCING STRATA AND THE INSTRUMENT THEREFOR

[75] Inventors: Richmond Bennett, Columbus, Ohio; Paul D. Schettler; Todd D. Gustafson, both of Huntingdon, Pa.

[73] Assignee: Columbia Gas System Service Corporation, Columbus, Ohio

[21] Appl. No.: 151,162

[22] Filed: Feb. 1, 1988

[51] Int. Cl.$^4$ .............................................. E21B 49/00
[52] U.S. Cl. ......................................... 73/155; 436/27; 436/28; 73/861.05
[58] Field of Search ................... 73/155, 432.1, 861.05; 436/27, 28; 166/250

[56] References Cited

U.S. PATENT DOCUMENTS

| | | | |
|---|---|---|---|
| 3,303,699 | 2/1967 | Scott | 73/861.05 |
| 4,107,525 | 8/1978 | Hart, Jr. | 250/303 |
| 4,153,418 | 5/1979 | Haas | 73/861.07 |
| 4,178,919 | 12/1979 | Hall | 128/719 |
| 4,197,456 | 4/1980 | Fleisher et al. | 250/303 |
| 4,532,812 | 8/1985 | Birchak | 73/861.27 |
| 4,635,468 | 1/1987 | Hickam et al. | 73/861.05 |

Primary Examiner—Stewart J. Levy
Assistant Examiner—Kevin D. O'Shea
Attorney, Agent, or Firm—Sidney W. Millard

[57] ABSTRACT

A cylinder is mounted to descend a borehole for purposes of measuring the mass flow rate of gas flowing upward in the borehole. Within the cylinder is a source of tracer gas which is ejected at a constant mass flow rate [05] from near the lower end of the cylinder. A tracer gas concentration measuring means near the top of the cylinder will measure the degree of concentration of the tracer gas and thereby provide a measurement of the mass flow rate of other gases flowing upwardly around the cylinder.

20 Claims, 2 Drawing Sheets

METHOD OF LOCATING HYDROCARBON PRODUCING STRATA AND THE INSTRUMENT THEREFOR

FIELD OF THE INVENTION

This invention relates to apparatus for measuring the flow rate of gas in a bore hole for purposes of locating gas producing strata.

BACKGROUND OF THE INVENTION

After a gas well or borehole is drilled, it is completed according to the determination of active zones that are usually localized within small segments of the several thousand feet of well bore. Completion may consist of stimulation of active zones, the sealing off of inactive zones by the insertion and cementing of tubing, the sealing off of active and inactive zones by tubing and the subsequent artificial perforation of the tubing in active zones. A presumption of all of this is that the active zones can be located and a downhole flowmeter is the most direct way of doing this. The flowmeter is lowered down the hole on a cable from a standard logging truck. Active zones are located by step like drops in the flow rate corresponding to the areas where the flow up the borehole is augmented by additional gas entering the borehole from the formation.

Normally, flow in the borehole may be expected to decrease as the meter is lowered reaching a flow of zero at the bottom. However, wells that are on line may be kept under pressure and it is possible that some imperfection in the completion process may result in gas leaving the borehole and entering the formation. Under these conditions step increases in flow rate may be observed in a well operated under pressure indicating that not all the gas which is produced is getting to the surface.

Although a wide range of types of flowmeters exist, only the turbine meter is in regular use as a downhole flowmeter. In this device a propeller is lowered down the well bore and gas entry points are located by changes in the rate of rotation of the propeller. This meter has at least two disadvantages. First, the desired quantity is the volume or mass flow of the gas, not the velocity of it. Conversion from one to the other requires knowledge of the bore cross sectional area and the flow profile within this area, quantities which are only known approximately. Second, the minimum velocity that a turbine meter will measure is variously placed at fifty to one hundred MCFD (volume flow equivalent). Many commercial wells, particularly in the Appalachian basin, have a total flow rate at the surface which is less than this minimum measurable quantity. Thus the turbine meter is not useful for these wells. Further, many wells that eventually produce over one hundred MCFD, do so only after stimulation of the active zones. The turbine meter is not useful for the predetermination of these potentially active zones.

The limited value of the turbine meter has lead to the use of several other tools to indicate gas entry points into the well bore. Among these is the sonic or noise meter that seeks to locate gas entry points or location of points where hissing or other noises can be heard. A difficulty of this meter is that some gas entry points are quiet.

Another meter is the temperature meter that locates gas entry points by anomalous decreases in temperature. Although the quoted reason for this anomalous decrease is the "Joule Thompson" cooling effect upon expansion, the actual response of the temperature tool is a complicated function of the amount of gas desorption, Joule Thompson expansion, the length of the conduit or fracture from the gas source to the borehole, the original temperature of the rock, time, and the dilution of the cooler gas entering the borehole by the flow of gas up the borehole from lower entry points.

The use of both sonic and temperature logs either sequentially or in tandem on a single cable confirms the vagaries of each in that often one will locate a gas entry point where the other fails. It is not clear that both tools used together will locate all gas entry points because the percentage of entry points which are both quiet and without cooling is unknown. Further, neither tool gives a quantitative estimate of the size of the gas entry point. In spite of these serious problems, these tools are in regular use in some areas because they are the best tool available.

There have been at least two prior attempts to overcome some of these difficulties. One was to utilize a thermoresistive element as a flow sensor. This device worked well in the laboratory and had real strength in the low flow regime. However, in the first (and only) field test the device proved to be very sensitive to the considerable mud present in the borehole environment. A second device used a pair of acoustic transducers to measure flow in conjunction with the Doppler effect. Both meters address only the low flow problem; neither measures mass or volume flow rate directly. It is believed that these two instruments are unknown in the oil and gas industry and are not public knowledge.

The measurement of the amount of dilution as a means of determining the flow rate of the diluent has had some prior use. For example, a technique that has been used to determine the flow rate of a stream or river is to inject into it a fluorescent dye at a known and constant flow rate. By measuring the concentration of the dye at a point sufficiently down stream so that complete mixing has occurred, one can determine the volume flow rate of the stream from the measured concentration, the original concentration of the undiluted dye, and the injection rate of the dye. U.S. Pat. Nos. 4,197,456 and 4,107,525 deal with devices of this type for liquid flow. This process has been extended to gases as described in U.S. Pat. No. 4,178,919 dealing with the injection of tracers to determine the uptake of oxygen in respiratory gases. However, there is no previous mention of use of such devices for gas wells. U.S. Pat. No. 4,532,812 discloses using two acoustic transducers in measuring the flow of gases.

SUMMARY OF THE INVENTION

This invention includes a tubular device, the lower end of which injects a tracer gas at a known concentration and flow rate into the upwardly flowing gas stream in the borehole of a natural gas well. This injection is accomplished by utilizing a pressure regulator which drops the pressure from a high pressure storage tank to a known fixed pressure. A precision metering valve then meters tracer gas at a known flow rate to a first or injector chamber within the lower part of the device. The metering valve is, in turn, connected to a solenoid valve which permits turning the flow on or off at will during the logging run. The injector chamber contains a fan which rapidly mixes the tracer with gas from the borehole and ejects the mixture through jets located close to the inlet ports.

The upper end of the tubular device contains an electrolytic sensor in a second or detector chamber. A second motor, mounted within the second chamber, rapidly samples gas from the borehole, blows it over the sensitive element of the sensor, and exits it through nearby jets. The detector chamber is located a few feet above the injector chamber so that gas, thoroughly mixed with tracer, is drawn in for concentration measurement. This distance between the two chambers is long enough so that further diffusion and/or turbulent flow mixing occurs between the two chambers. The flow rate of the gas in the borehole is determined by:

$$F = F_o(C_o - C)/C \qquad (1)$$

where
F is the flow rate to be measured.
Fo is the flow rate of the tracer into the injector chamber.
Co is the concentration of the injected tracer.
C is the measured concentration of tracer in the detector chamber.

The device is made so as to interface with a standard seven wire wireline. Thus it can be lowered down the borehole at a constant logging rate. The flow thus measured will be the sum of the effect due to the gas flowing up the borehole and the speed of the instrument descending. The gas flow rate in the well bore can be obtained by subtracting a factor proportional to the logging rate and the cross sectional area of the borehole from the measured flow rate. The flow from an active zone can be obtained from the difference of measured flows above and below the strata in question.

The above equation is based on prior calibration of the tubular device in a wind tunnel where a specified flow rate for the tracer gas is constant and the gas in the tunnel is controllable. The flow rate of gas in the tunnel is first set at one rate and measurements are taken from the electrolytic sensor. Then the flow rate is increased in the tunnel to another specified rate and again measurements are taken. A series of measurements are taken with known tunnel flow rates and these can be compared to readings taken by the same instrument in a borehole and the flow rates in the borehole can be determined by the comparison.

Objects of the invention not clear from the above will be understood more fully by an observation of the drawings and a detailed description of the preferred embodiment which follows.

DESCRIPTION OF THE PREFERRED EMBODIMENT

Figure 1:
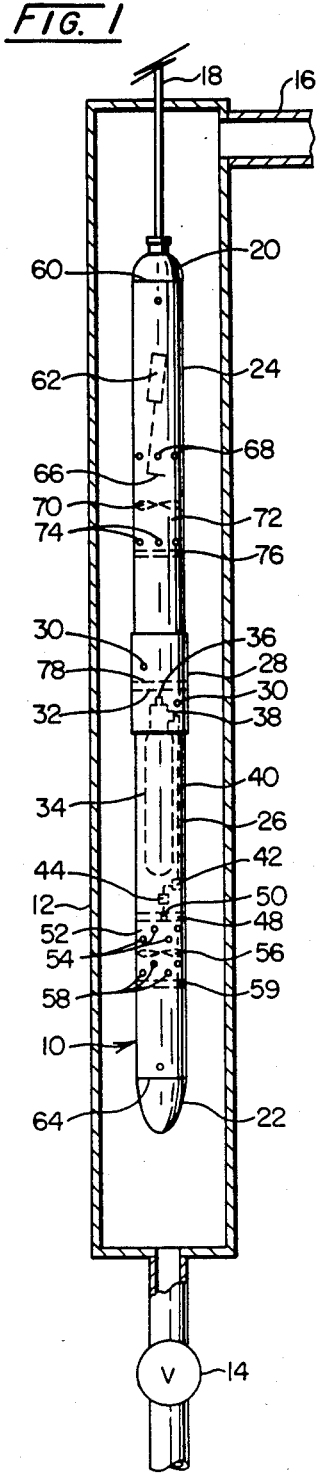
FIG. 1, is an elevational view of the instrument of this invention in a calibration tunnel.

Looking to FIG. 1, an instrument 10 for measuring mass flow rates in a borehole is suspended in a tunnel 12 which serves as a calibration apparatus. Air or some other suitable calibration gas is pumped into tunnel 12 through a control valve 14 at the lower end of the tunnel and the calibration gas exits at the top of the tunnel at discharge pipe 16. The valve 14 is adjustable to control the specific flow rates of the calibration gas as will be explained subsequently.

Instrument 10 is shown suspended in tunnel 12 by a cable 18 which in turn is attached to a tool head 20 on the top of the instrument. The tool head is conventional so a detailed description is not necessary. While the instrument is illustrated as being suppended by a cable, it is possible to support the instrument on blocks or harnesses in a horizontal position in a horizontal tunnel.

Attached to the lower end of the instrument is a sinker bar 22. The sinker bar serves the function of being a relatively heavy weight to hold the instrument in relatively steady orientation and generally to stablize the tool against buffeting by high influent velocities and to supply the minimum tension for the logging equipment which will be attached when the instrument is lowered into a borehole. Note that the nose of the sinker bar is rounded to streamline the nose of the tool and facilitate its descent into a borehole.

It will be noted that the instrument or sonde is formed of three tubular pieces. Each piece may be made of number 304 stainless steel tubing having a wall thickness of about 0.150 inches. The upper section 24 and lower section 26 have about a 2.9 inch inside diameter and about a 3.2 inch outside diameter and the two sections are joined together by a coupling section 28. The coupling 28 has an inside diameter of about 3.2 inches to allow the telescoping penetration by the upper and lower sections 24 and 26. The indicated outside diameters allow the sonde to descend into four inch diameter bore holes.

Six set screws 30 threaded through coupling 28 to hold the upper and lower sections in place, three for each section. Two other screws (not shown) hold a Nylon bulkhead 32 in place about the center of coupling 28. The Nylon bulkhead 32 which is about two and seven-eighths inches in diameter and about one-half inch thick is press fitted into the coupling and its function is to separate the two sections 24 and 26 and prevent fluid communication. It also serves as a bumper to limit the insertion of the two tubular sections.

Figure 2:
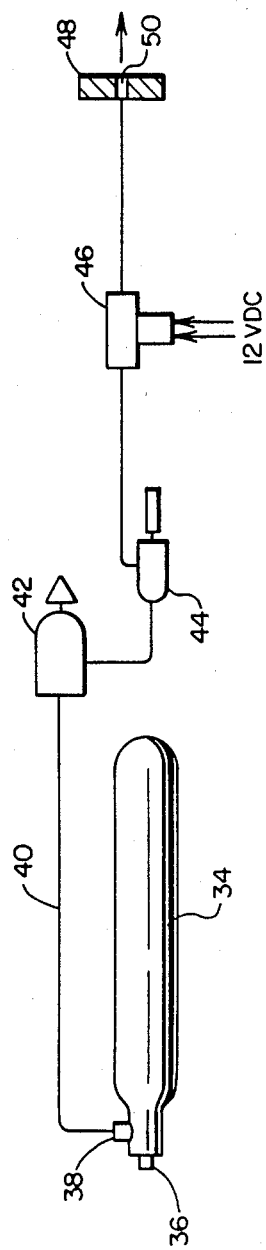
FIG. 2 is an exploded view of the apparatus within the lower part of the instrument of FIG. 1.

Looking now to FIG. 2, a gas cylinder 34 is mounted in upright position, that is, the valve 36 for opening and closing the outlet 38 to the cylinder is located in the upper part of the tubing section 26 nearest to the coupling 28 and the reason will be explained subsequently. As explained previously the sonde may be horizontal in a horizontal tunnel but either orientation is satisfactory. Gas from discharge opening 38 exits through a flow line 40 downward to a pressure regulator 42 and then to a controller 44. A solenoid valve 46 (See FIG. 2) is located in the flow line 40 intermediate the flow controller 44 and another Nylon bulkhead 48. The solenoid is a 12 volt direct current 350 MA and it is connected to the flow controller by means not shown.

Note that line 40 extends through an opening 50 in bulkhead 48 into a mixing chamber 52 (see FIG. 1). Calibration gas from tunnel 12 is drawn into the mixing chamber 52 through inlet holes 54. The calibration gas and the tracer gas from tank 34 are drawn into mixing chamber 52 because of a vacuum is created by a mixing fan 56 which agitates the two gases and discharges them through outlet holes 58. Bulkhead 59 serves as a barrier to the gas in the sonde.

Note that there are two rows of outlet holes 58. The first row is one foot, two and one-quarter inches from the lower end 64 of section 26 of the tubing, and the second row is one foot, three inches from end 64. Each hole is three-eighths inches in diameter and the holes are spaced apart 45° around the periphery of section 26. Note further that the two rows of outlet holes are offset by 22½° from each other. The net cross-sectional area of the holes 58 in the ejector pattern is about 1.6 square inches.

The inlet holes 54 are also three-eighths inches in diameter, spaced 45° apart and offset from each other by 22½°. The first row of inlet holes is one foot, five and nine-sixteenths inches from tube end 64 and the second row is one foot, six and five-sixteenths inches from end 64. The net cross-sectional area of holes 54 is about the same as holes 58.

Looking now to the upper section 24 of the tubing, a sensor unit 62, designed to measure the concentration of tracer gas from tank 24, is mounted nearest the upper end 64 of tubing 24. Note that it has a probe 66 extending to a point between inlet holes 68 and a fan 70. Fan 70 blows the mixture of tracer gas and calibration gas from the tunnel or borehole into a discharge chamber 72 where its passage is blocked by Nylon bulkhead 76 and thus the blown gas will be forced to exit the chamber 72 through discharge holes 74. Holes 68 and 74 each have a net cross-sectional area of about 0.8 square inches.

Because the atmosphere in a borehole is explosive, the drive motors of fans 56 and 70 are non-arcing and such motors are commercially available.

Both tubing pieces 24 and 26 are about four feet long so the total length of the instruments, sinker bar and tool head attachment is about eight or nine feet. Drain holes (not shown) for liquids may be provided at bulkheads 32, 76 and 59 to prevent the collection of liquids.

In locating the inlet and outlet holes 68 and 74 in upper section 24, measuring from end 78 which is inserted into coupling 28, the distance to the first row of outlet openings 74 is one foot, four inches and the distance to the second row is one foot, four and one-half inches. The holes are spaced 90° apart around the periphery and the holes in the spaced apart rows are offset 45° from each other. The inlet holes are similarly offset and are spaced two feet, one-half inch and two feet, one inch from end 78 respectively.

The reason that the outlet holes 58 in the lower section 26 are furthest from the coupling 28, and the inlet holes 68 in upper section 24 are similar furthest from the coupling 28 is to get the greater separation between where the tracer gas is discharged (outlet holes 58) into the tunnel or borehole and the place where the mixed gas will be drawn back into the tubing (inlet holes 68) for sampling the tracer gas concentration. The further apart are these two sets of openings, the greater will be the uniformity or consistency of the mixed gases.

Figure 3:
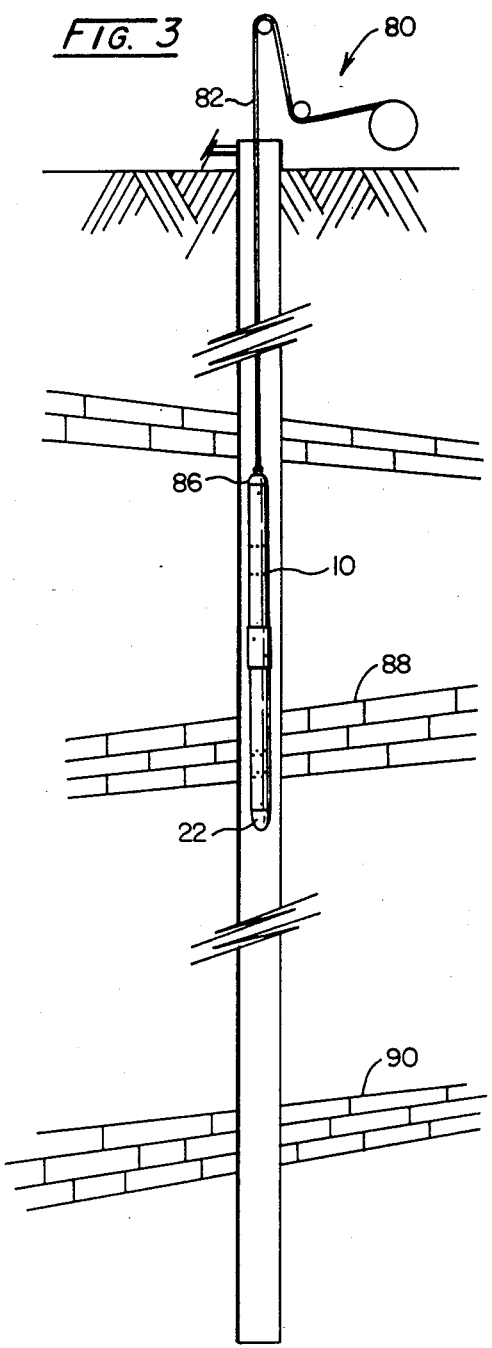
FIG. 3 shows the instrument of FIG. 1 being lowered into a borehole.

Turning now to FIG. 3, a conventional logging-type apparatus 80 lowers the instrument 10 by a cable 82 into a borehole or wellhole and the cable is attached to the instrument by a conventional toolhead 86 which includes connections for various electrical lines for powering parts of the apparatus and transmitting readings to the surface.

In operation, the instrument 10 will be lowered into borehole but before the descent begins, screws 30 holding the lower section 26 within coupling 28 will be loosened and the coupling will be lifted from the upper end of section 26. This allows valve 36 of the gas cylinder 34 to be opened manually and allows the high pressure tracer gas to exit through opening 38 and into line 40. The regulator 42, flow controller 44 and solenoid 46 will have previously been adjusted to feed a specified flow of tracer gas at a specific pressure from cylinder 34 into mixing chamber 52. Then the coupling 28 will be reattached and the instrument 10 will be lowered into the borehole.

At the upper end of the borehole the mass flow rate will be the greatest of any place in the borehole and accordingly the sensor assembly 62 should read the lowest tracer gas concentration of any time during the logging operation.

In a typical borehole there will be a plurality of strata and often more than one such strata will be leaking gas into the borehole, for example, strata 88 and 90. As the instrument 10 descends past strata 88 the concentration of the tracer gas entering inlet holes 68 will increase and this gas producing location in the borehole will be noted by the instruments at the surface. The concentration should remain fairly stable in its further descent until the instrument begins to pass strata 90 which would be another gas producing strata and at that point the concentration of the tracer gas will begin to increase again and it should become relatively stable below strata 90.

The drawing thicknesses of the strata indicated in the borehole are clearly out of proportion to the size of the instrument 10 but it is believed that the concept will be clear from the above description.

It is important to know the mass flow rates of the gas from strata 88 and 90, not just that they are gas producing strata. That is where the calibration operation as described in relation to FIG. 1 comes into play and how the mass flow rate equation described above will be used by the logging apparatus to tell the operators the mass of gas flowing upward at the various levels within the logging operation. As indicated above, the mass flow rate must be adjusted for the uniform rate of descent of the instrument because the descent would appear to indicate a greater mass flow rate than in fact exists because the instrument is dropping at the same time the gas is flowing upward.

The measurement of flow, F, requires accurate determination of the other parameters in equation (1). The concentration, Co, is determined by utilizing a tracer gas with known concentration of the detector-active gas in an inert, detector-inactive carrier gas. The flow of tracer gas, Fo, is determined by an adjustable flow controller. The tracer gas flow rate, Fo and the tracer composition, Co, are determined before the logging run. Typical values are Fo=100 ml/min. and Co=10% tracer in nitrogen. The concentration, C, is measured continuously during a run by a detector whose voltage output is proportional to the concentration of the tracer gas. A great variety of such detectors is available, not all of which are suitable. There are several important considerations that must be taken into account in choosing a tracer gas and associated detector. The gas to be used as a tracer cannot be a major component of the gas the well is producing. The detector utilized must be small, respond rapidly to changes in concentration of the tracer gas, be unaffected by variation of the concentration of other components of gas in the well, and the detector must produce a voltage proportional to concentration accurately over a range of at least two orders of magnitude. Further, it is desirable that the electrical signal produced be directly proportional to the concentration of tracer. Electrolytic type sensors in conjunction with appropriate gases such as $H_2S$, $H_2$, and CO have been found to be best suited for this service.

Equation (1) is based on the principle of the conservation of matter. In the simplest case consisting of the flowmeter sonde at rest, the parameter F is the flow past the detector. In a well bore, closed at the bottom end, it is the simple sum of all the flow sources below the detector. In the most generally useful case wherein the sonde is moving, the parameter F is equal to $$F = \frac{(F_{1g} + F_{2g} + k'v)(F_{1g} + kv)}{F_{1g} + k'v} \quad (2)$$

where $F_{1g}$=volume flow rate of gases from sources below the tool.

$F_{sg}$=volume flow rate of gases from sources between the injector and detector.

v=logging rate, the speed of lowering the tool down the well. It should be noted that logging must be done from the surface down instead of from the bottom up as is customary.

$k = k'' \pi d^2/4$ where d=well bore diameter $k' = k'' \pi d'^2/4$ where '=tool diameter.

$k''$=dimensional factor to convert kv and k'v into volume flow rate units consistent with those used in other terms (normally, thousand cubic feet per day, MCFD).

The terms involving k and k' arise from consideration of the instrument response in an environment wherein the tool is moving during the logging operation. Specifically, kv arises from the relative motion of the sources, $F_{1g}$ and $F_{2g}$, in respect to the tool injector moving at logging rate v. The term k'v arises from the displacement affect of the tool in the well bore.

In operation, voltage produced by the sonde is transmitted to an analog to digital converter located outside the well. The resulting digital signal is processed by a digital computer which computes F', defined as $$F' = F - kv \quad (3)$$

The parameter F is computed from equation (1), k is determined from the well bore radius, and v is determined from the truck's logging rate (the rate that the sonde is lowered down the well bore).

Through most of a logging run $F_{2g}$ is zero and F' is a simple measure of the flows, $F_{1g}$, due to the sources down-hole from the tool.

$$F' = F_{1g} \quad (4)$$

When the injector moves past a source resulting in a finite value of $F_{2g}$, F' increases as determined by equation (2) then decreases to a new lower value (determined by equation (4) for the remaining flows) when the source moves above the detector and $F_{2g}$ is again zero. The difference between F' before the injector passed the source and after the detector passed the source, corresponds to the magnitude of the source. The magnitude of the peak in F' while the source is between the injector and the detector serves to mark the source with increased certainty. If the logging is stopped corresponding to v=O, while a source is between the detector and the injector, equation (2) reduces to simply the total sources below the detector:

$$F' = F = F_{1g} + F_{2g} \quad (5)$$

It should be noted that equation (5) is independent of the bore diameter; an additional reason for stopping the sonde is the complete elimination of the possible effects of changes in the well bore diameter.

The accuracy of equation (5) (and associated measurement of the parameters, Fo and Co) for measuring flow under conditions of zero logging rate, v=O, has been determined utilizing a well simulator. This device consists of a tube in which the sonde rests, and through which is passed a flow of air at a calibrated rate. The flow rates furnished by the simulator permit checks of the instrument through a broad flow range resulting in a calibration curve of flow measured by the device. In this manner equation (5) has been shown to be correct within the limits of accuracy of the flow meters used in the simulator.

Field use of the flow sonde has verified the accuracy of equation (3) under real logging conditions. A digital to analog voltage converter is used to convert the digitally computed value of F' back into a voltage signal that in turn drives the logging truck's log recording equipment. The interface with this recording equipment common to normal logging operations means that an on-site calibrated chart or log of F' as a function of depth can be produced in the identical manner of other logging tools.

Testing to date has been in wells wherein the flow is known to be entering through perforations in the pipe with which the well is cased. The logging must be done from the surface down, as opposed to normal logging procedure in which logging is done from the bottom up. Above the perforations, the valve of F' recorded corresponds to the flow rate issuing from the well as measured from the surface. As the sonde moves past a producing perforation F' increases to a peak, then decreases to a new lower value as expected. The sum of all the decreases adds up to the total flow from the well. In this context the sonde thus determines quantitatively the relative success of each perforation in accessing a gas producing rock formation.

In a non producing well we have verified that the production was less than 0.04 MCFD by turning off the injection control solenoid, moving the sonde into a region not previously contaminated by tracer, turning on the solenoid briefly to inject a plug of tracer into the well bore, waiting for a period of time, then measuring the distance that the sonde is lowered before the detector encounters the tracer gas. The flow rate is obtained from $$F = k''(d - d')/t \quad (6)$$

where d is the distance between the injector and the detector.

d' is the distance the sonde was lowered.

t is the wait time.

$k''$ is a factor to cert dimensions

Between these two methods we have covered flows ranging from below 0.1 MCFD (thousand cubic feet per day) to about 40 MCFD. Flow rates outside this range can be accessed by changing the tracer flow rate, Fo, or concentration, Co.

The use of the mixing fans causes the gas to be thoroughly mixed with the tracer as it flows by the tool, thus insuring that the sonde is a true volume flow meter. This is a considerable improvement in comparison to devices that only measure flow velocity because this varies from point to point across the well bore at any given depth. Furthermore flow velocity changes radically with variations in well bore diameter. This is also a considerable improvement over devices that measure flow indirectly such as by temperature changes or by microphonics.

During logging the sonde may be lowered at any normal logging speed or held stationary since its operation is not dependent on logging rate. In typical use, the electronics, fan power, and injector system are switched on near the top of the well. After waiting until the detector zero has stabilized, the injector system is switched off by cutting power to the solenoid and the voltage, Vo, corresponding to zero injected tracer gas concentration is determined. Then the solenoid is switched back on and the flow rate determined using equation (4). The surface computer determines the concentration of the tracer through the equation $$C = A(V - Vo) \quad (7)$$

and from this F' from equations (1) and (3). The value of $F_{1g}$ is then compared with the total flow measured at the surface, if such is available. While calibration can/is accomplished in the laboratory, field checks of its stability are only prudent. For example shifts in Vo may indicate that a component of the gas produced is affecting the sensor. At this point the bore hole diameter and the anticipated logging rate are entered into the computer. These parameters are necessary in the computation of F'.

Logging proceeds downward at the prearranged logging rate. The instrument can be used at the normal logging rate of thirty feet per minute. At slower logging rates instrument response is less dependent upon the bore hole diameter than at higher rates. As the sonde moves downward the value of F' remains constant at $F_{1g}$ until the first source is reached. As the injector moves past the source, the value of F' initially increases, then decreases to a new constant value as the detector moves below the source. The difference between the initial and final constant values is the flow rate due to the source. The value of F' thus decreases in a series of steps; each step is preceded by a spike. Logging trucks have instrumentation that determines the depth of the tool at any point. Thus the spikes can be used to locate the depths of the sources and differences between the plateaus on either side of the sources can be used to determine the magnitude of flow from each source.

The computed value of F' is converted to a DC voltage utilizing a digital analog converter associated with the computer. This voltage can be substituted for the normal signal voltage that the wide variety of down hole logging sondes produce. The result is that a voltage proporational to F' is fed directly into the logging truck's recording equipment. Normally, logging trucks have the ability to transform these voltages directly into a chart of "log" of the voltage as a function of depth. The net effect in the present case is the production of a chart of flow as a function of depth. Each step drop of the logging tracer on the chart marks a flow source through the sides of the well bore. These drops can be further recognized by the characteristic spike on the edge of the step drop.

Having thus described the invention in its preferred embodiment it will be clear to those having ordinary skill in the art that modifications may be made to the apparatus and the procedural steps without departing from the spirit of the invention. It is not intended that the words used to describe the invention in the specification nor the drawings illustrating the same be used in a limiting sense. Rather it is intended that the invention be limited only by the scope of the appended claims.

We claim:

1. A process for measuring the mass gas flow rate in a well, comprising,
   providing an instrument with a tracer gas ejection means near its lower end and a tracer gas concentration measuring means near its upper end,
   placing said instrument in a tunnel,
   ejecting tracer gas from the lower end of said instrument at some mass flow rate while moving a calibrating gas through said tunnel at a plurality of different specified mass flow rates,
   measuring the concentration of said tracer gas by said measuring means at each of said plurality of flow rates to calibrate the instrument,
   lowering said instrument into a well while ejecting said tracer gas at said some flow rate,
   measuring the concentration of said tracer gas by said measuring means while the instrument descends into the well, and
   determining the mass flow rate of gas in the well throughout its length by comparing the concentration of the well readings with the calibration reading.

2. The process of claim 1 wherein the reading comparison is made according to the following equation:

$$F = Fo \frac{(Co - C)}{C}$$

where
F = Mass flow rate in the well
Fo = Mass flow rate of the tracer gas
Co = Concentration of the tracer gas as it is ejected from the instrument
C = Measured concentration of the tracer gas at the upper end of the instrument.

3. The process of claim 2 wherein the tracer gas is selected from a group consisting of $H_2S$, $N_2$, $H_2$, $CO_2$, and CO.

4. The process of claim 1 wherein the tracer gas is selected from a group consisting of $H_2S$, $N_2$, $H_2$, $CO_2$, and CO.

5. A process for measuring the mass flow rate of gas from a well extending into the earth through various strata comprising,
   providing an instrument having a tracer gas ejecting means near its lower end and a tracer gas concentration measuring means near its upper end,
   starting the ejecting means at some specific tracer gas mass flow rate,
   lowering the instrument into the well at some specific rate of descent,
   measuring the changing concentrations of the tracer gas by the measuring means throughout the descent,
   determining the location of a source of gas entering the well from the strata by reviewing the measured concentrations during the descent.

6. The process of claim 5 including calibrating the instrument prior to its descent.

7. The process of claim 6 wherein the calibration is performed by placing the instrument in a tunnel and moving calibration gas through the tunnel at a plurality of different specific mass flow rates while ejecting tracer gas from near the lower end of said instrument at a specific single flow rate and measuring the different tracer gas concentrations at the upper end of the instrument through the plurality of different calibration gas flow rates.

8. The process of claim 7 wherein the determination of the location of a source gas entering the well from the strata is taken from the equation, $$F = F_o \frac{(C_o - C)}{C}$$

where
- F = Mass flow rate in the well
- Fo = Mass flow rate of the tracer gas
- Co = Concentration of the tracer gas as it is ejected from the tool
- C = Measured concentration of the tracer gas at the upper end of the tool.

9. The process of claim 8 wherein the tracer gas is selected from the group consisting of $H_2S$, $N_2$, $H_2$, $CO_2$, and CO.

10. The process of claim 5 wherein the determination of the location of a source gas entering the well is taken from the equation, $$F = F_o \frac{(C_o - C)}{C}$$

where
- F = Mass flow rate in the well
- Fo = Mass flow rate of the tracer gas
- Co = Concentration of the tracer gas as it is ejected from the instrument
- C = Measured concentration of the tracer gas at the upper end of the instrument.

11. The process of claim 5 wherein the tracer gas is selected from the group consisting of $H_2S$, $N_2$, $H_2$, $CO_2$, and CO.

12. The process of claim 6 wherein the tracer gas is selected from the group consisting of $H_2S$, $N_2$, $H_2$, $CO_2$, and CO.

13. The process of claim 7 wherein the tracer gas is selected from the group consisting of $H_2S$, $N_2$, $H_2$, $CO_2$, and CO.

14. The process of claim 10 wherein the tracer gas is selected from the group consisting of $H_2S$, $N_2$, $H_2$, $CO_2$, and CO.

15. Apparatus for measuring the mass flow rate of gas in a well comprising,
an instrument mounted in said well, said instrument having a tracer gas dispensing means near one end and a tracer gas concentration measuring means near the other end,
a source of tracer gas in said instrument,
means connecting the source of tracer gas to the gas dispensing means, and
means for discharging said tracer gas through said dispensing means at a constant mass flow rate.

16. The apparatus of claim 15 including means forming a mixing chamber in said cylinder, the dispensing means comprising a fan drawing tracer gas into the mixing chamber means and discharging said mixture through openings in the cylinder.

17. The apparatus of claim 16 including means forming a tracer gas concentration measuring chamber in said cylinder, means for drawing gas from outside the cylinder into said concentration measuring chamber means.

18. The apparatus of claim 17 wherein the means for drawing gas into the concentration measuring chamber means comprises apertures in said cylinder and a vacuum forming fan in said cylinder.

19. The apparatus of claim 15 including means forming a tracer gas concentration measuring chamber in said cylinder, means for drawing gas from outside the cylinder into said concentration measuring chamber means.

20. The apparatus of claim 19 wherein the means for drawing gas into the concentration measuring chamber means comprises apertures in said cylinder and a vacuum forming fan in said cylinder.

* * * * *